United States Patent [19]

Machon

[11] 4,210,734
[45] Jul. 1, 1980

[54] CONTROLLED ETHYLENE POLYMERIZATION PROCESS

[75] Inventor: Jean P. Machon, Bethune, France

[73] Assignee: Societe Chimique des Charbonnages-CdF Chimie, Paris-la-Defense, France

[21] Appl. No.: 930,668

[22] Filed: Aug. 3, 1978

[30] Foreign Application Priority Data

Aug. 9, 1977 [FR] France ................. 77 24540

[51] Int. Cl.² ........................... C08F 4/02; C08F 4/66; C08F 10/02
[52] U.S. Cl. ................................. 526/65; 252/429 C; 526/119; 526/125; 526/352; 526/919
[58] Field of Search ........................ 526/65, 119, 125

[56] References Cited

U.S. PATENT DOCUMENTS

| | | | |
|---|---|---|---|
| 3,238,146 | 3/1966 | Hewett et al. | 526/125 |
| 3,509,117 | 4/1970 | Rust et al. | 526/119 |
| 3,969,332 | 7/1976 | Gloriod et al. | 526/127 |
| 4,014,859 | 3/1977 | Cooper et al. | 526/65 |

FOREIGN PATENT DOCUMENTS

| | | | |
|---|---|---|---|
| 1292853 | 10/1972 | United Kingdom | 526/125 |
| 1391322 | 4/1975 | United Kingdom | 526/151 |
| 1441115 | 6/1976 | United Kingdom . | |
| 1441117 | 6/1976 | United Kingdom . | |

Primary Examiner—Edward J. Smith

Attorney, Agent, or Firm—Finnegan, Henderson, Farabow, Garrett & Dunner

[57] ABSTRACT

A high-temperature, high-pressure process for polymerizing ethylene in a reactor system having at least two reaction zones with a catalytic system including an activator (a), a compound (b), and a compound (c). Compounds (b) and (c) are injected into different reaction zones. Activator (a) is selected from hydrides and organometallic compounds of a metal of groups I to III of the Periodic Table. Compound (b) is represented by the formula

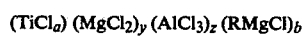

in which
$2 \leq a \leq 3$, $y \geq 2$, $0 \leq z \leq \frac{1}{2}$, $0 \leq b \leq 1$
and R is an aliphatic or aromatic hydrocarbon radical.

Compound (c) is represented by the formula

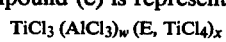

in which $0 \leq w \leq \frac{1}{2}$, $0 \leq x \leq 0,03$ and E is a diisoamyl- or di-n-butylether.

The amounts of (a), (b), and (c) are such that the ratio Al/Ti is between 1 and 10 in each reaction zone. The resulting polymers have a wide molecular weight distribution and a substantial proportion of very high molecular weights and are suitable for the blow-extrusion technique.

7 Claims, No Drawings

CONTROLLED ETHYLENE POLYMERIZATION PROCESS

The present invention relates to a controlled ethylene polymerization process and, more particularly, to a process for polymerizing ethylene at elevated temperature and pressure by means of Ziegler-type catalysts.

It is well known to polymerize ethylene at elevated temperature and pressure according to an ionic mechanism by means of a catalytic system comprising titanium trichloride (possibly syncristallized with aluminum chloride) and an activator such as an alkylaluminum or an alkylsiloxalane. There has been described in French Pat. No. 2,342,306 a process for polymerizing ethylene at a temperature of between 180° and 340° C. under a pressure of between 200 and 2,500 bars, in at least one reactor comprising at least one reaction zone, by means of a catalytic system comprising an activator (a) selected from alkylaluminums and alkylsiloxalanes and a compound (b) represented by the formula $(TiCl_a)(MgCl_2)_y(AlCl_3)_z(RMgCl)_b$ in which $2 \leq a \leq 3$, $y \geq 2$, $0 \leq z \leq \frac{1}{3}$, $0 \leq b \leq 1$ and R is an aliphatic or aromatic hydrocarbon radical, the amounts of (a) and (b) being such that the atomic ratio Al/Ti is between 1 and 10. However a polymer having a wide molecular weight distribution and comprising a sufficient amount of very high molecular weights (both properties being necessary for transforming high-density polyethylene by the blow-extrusion technique) can hardly be manufactured according to the latter process. The object of the invention is therefore to provide means for manufacturing a polymer fitted for the blow-extrusion technique, said means permitting to maintain or even increase the adaptability of the process without requiring too important investment.

Surprisingly it has been found that simultaneously using in separate reaction zones the compound (b) above on the one hand and titanium trichloride not bound with magnesium chloride on the other hand permits solving the above-mentioned problem.

The present invention therefore relates to a process for polymerising ethylene at a temperature of between 180° and 340° C. under a pressure of between 200 and 2,500 bars in a reactor system comprising at least two reaction zones, by means of a catalytic system comprising:

(a) an activator selected from hydrides and organometallic comounds of a metal of groups I to III of the Periodic Table,
(b) a compound represented by the formula $$(TiCl_a)(MgCl_2)_y(AlCl_3)_z(RMgCl)_b$$

in which $2 \leq a \leq 3$, $y \geq 2$, $0 \leq z \leq \frac{1}{3}$, $0 \leq b \leq 1$ and R is an aliphatic or aromatic hydrocarbon radical, and
(c) a compound represented by the formula $$TiCl_3(AlCl_3)_w(E, TiCl_4)_x$$

in which $0 \leq w \leq \frac{1}{3}$, $0 \leq x \leq 0{,}03$ and E is a diisoamyl- or di-n-butylether, wherein the compound (b) is not injected in the same reaction zone as the compound (c) and wherein the amounts of (a), (b) and (c) are such that the atomic ratio Al/Ti is between 1 and 10 in each reaction zone. Furthermore a ratio (c)/(b) of the molar flow rates of said catalytic compounds between 1 and 9 will be preferred according to the invention.

Activators suitable for carrying out the present invention include namely alkylaluminums and alkylsiloxalanes. As indicated by its formula, the compound (c) may be either titanium trichloride (when $w \leq x \leq 0$) or titanium trichloride syncristillized with aluminum chloride (when $W = \frac{1}{3}$ and $x = 0$) or a catalytic component prepared according to French Pat. No. 2,334,416 (when x differs from zero). As stated above, the present invention requires the existence of at least two reaction zones: it may be either a single reactor comprising at least two zones or two or more reactors arranged in parallel, each of them comprising at least one zone. The residence time of each catalytic compound in its own reaction zone is between 1 and 150 seconds.

The present invention is also applicable to the copolymerisation of ethylene with α-olefins such as propylene, butene-1, and to the terpolymerisation of ethylene with an α-olefin such as propylene and with a non-conjugated diolefin. As already known, one or several chain transfer agents, such as e.g. hydrogen, may be used in the process of the invention in order to regulate and control the polymer characteristics. The reaction mixture may be further comprise an inert diluent such as ahydrocarbon (e.g. propane or butane) in a proportion of up to 50 percent by weight of the gaseous mixture.

As in French Pat. No. 2,342,306, it may be advantageous to produce "in situ" the compound (b) of the catalytic system by reacting violet titanium trichloride with anhydrous magnesium chloride, both reactants being injected by separated feed-lines which open concentrically into the concerned reaction zone.

The invention will be better understood by reference to the following non limiting examples.

EXAMPLES 1 to 3

There is considered a cylindric stirred autoclave reactor comprising:
- a zone 1 operating at a temperature of 220° C., fed by 40% of the total ethylene flow rate and provided with a catalyst injector,
- a zone 2 operating at a temperature of 240° C., fed by 40% of the total ethylene flow rate and in which no catalyst is injected, and
- a zone 3 operating at a temperature of 260° C., fed by 20% of the total ethylene flow rate and provided with a catalyst injector and a line for drawing off the polymer.

The three reaction zones have the same volume and the residence time in the reactor is about 60 seconds. Polymerisation of ethylene is effected therein under a pressure of 1,200 bars and in the presence of hydrogen as a transfer agent, its concentration in the reactor being adjusted in every case in order to yield polymers having approximately the same melt index. Trioctyl-aluminum is the activator used in the three examples below.

Besides there are considered the following catalysts:
b is a compound represented by the formula

$TiCl_3(AlCl_3)_{\frac{1}{3}}(MgCl_2)_6$ c is a compound represented by the formula

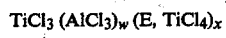
$TiCl_3(AlCl_3)_{\frac{1}{3}}$

Eachcatalyst is preactivated with trioctyaluminum until an atomic ratio Al/Ti of 1 is reached, then prepolymerized with 1-hexene in a molar ratio 1-hexene/Ti of 5 and then activated with trioctylaluminum until a final atomic ratio Al/Ti of 3.

Table I below indicates the catalysts injected respectively into zone 1 and into zone 3. Thus examples 1 and 2 appear as comparative examples whereas example 3 is according to the invention. The polymer obtained is characterized by its specific gravity (g/cm3), its melt index MI measured in g/10 mn according to ASTM 1238-62 T, its weight average molecular weight $M_w$ (measured by gel permeation chromatography), its proportion B of molecular weights lower than 5,000 and its polydispersity index Mw/Mn (Mn being the number average molecular weight). Table I also shows the catalytic yield $R_c$ in kgspolymer per milliatom titanium.

It will be noticed that, every polymerization condition being otherwise equal, the simultaneous use of such different catalyst compounds in separate reaction zones permits increasing Mw by more than 40% and considerably increasing the polydispersity index.

EXAMPLE 4 TO 6

There is considered a cylindric stirred autoclave reactor comprising:
 a zone 1 operating at a temperature of 220° C., fed by 50 percent of the total ethylene flow rate and provided with a catalyst injector,
 a zone 2 in which no catalyst is injected and from which all the polymer is drawn off, and
 a zone 3 operating at a temperature of 260° C., fed by 50 percent of the total ethylene flow rate and provided with a catalyst injector.

The polymerisation conditions are identical to those of the preceding examples. The same catalysts b and c are contemplated and the zone where they are injected is defined in Table II below. Thus examples 4 and 5 appear as comparative examples whereas example 6 is according to the invention. The polymer obtained and the catalytic yield have been characterized like in the preceding examples and the experimental results collected in Table II.

TABLE I

| Ex. | Zone 1 | Zone 3 | % H$_2$ | R$_c$ | ρ | MI | M$_w$ | M$_w$/M$_n$ | B % |
|---|---|---|---|---|---|---|---|---|---|
| 1 | c | c | 0.3 | 4.9 | 0.962 | 0.60 | 135,000 | 5.6 | 5.2 |
| 2 | b | b | 0.1 | 13.2 | 0.963 | 0.70 | 128,000 | 3.8 | 3.5 |
| 3 | c | b | 0.1 | 9.0 | 0.963 | 0.55 | 190,000 | 12.4 | 5.3 |

TABLE II

| Ex. | Zone 1 | Zone 3 | % H$_2$ | R$_c$ | ρ | MI | M$_w$ | M$_w$/M$_n$ | B % |
|---|---|---|---|---|---|---|---|---|---|
| 4 | b | b | 0.1 | 12.8 | 0.964 | 0.80 | 130,000 | 5.2 | 4.5 |
| 5 | c | c | 0.2 | 4.3 | 0.962 | 0.65 | 150,000 | 6.5 | 6.3 |
| 6 | c | b | 0.1 | 8.5 | 0.962 | 0.4 | 183,000 | 13.2 | 5.2 |

EXAMPLES 7 AND 8

There is now considered an apparatus for polymerising ethylene under high pressure consisting of two reactors arranged in parallel and fed by approximately equivalent flow rates of ethylene:
 a stirred reactor having a capacity of 0.9 liter and constituting zone 1 of the apparatus, operating at a temperature of 220° C. and provided with a catalyst injector, and
 a stirred cylindric reactor having a capacity of 3 liters and comprising two zones. Zone 2 operates at a temperature of 235° C., it is fed with ethylene and provided with a catalyst injector. Zone 3 operates at a temperature of 270° C., it receives neither additional ethylene nor catalyst and it permits drawing off the polymer formed.

Polymerization is effected in the presence of 2 percent by weight propane used as a diluent and eventually (see Table III) of hydrogen as a transfer agent in order to get polymers having a substantially equivalent melt index.

Dimethylethyl-diethylsiloxalane is the activator used in both examples. The catalysts contemplated are those, b and c, of the preceding examples preactivated according to the same method. The catalyst b is injected in zone 2; the catalyst injected in zone 1 is defined in Table III below. Thus it is clear that example 7 is comparative whereas example 8 is according to the invention. The polymer obtained and the catalytic yield have been characterized like in the preceding examples and the experimental results collected in Table III.

TABLE III

| EXAMPLE | Zone 1 | % H$_2$ | R$_c$ | ρ | MI | M$_w$/M$_n$ |
|---|---|---|---|---|---|---|
| 7 | b | 0,2 | 9,6 | 0,955 | 1,1 | 4,3 |
| 8 | c | 0 | 6,2 | 0,947 | 1,3 | 7,6 |

What we claim is:

1. A process for polymerising ethylene at a temperature of between 180° and 340° C. under a pressure of between 200 and 2,500 bars in a reaction system comprising at least two reaction zones, by means of a catalytic system comprising:
 (a) an activator selected from hydrides and organo-metallic compounds of a metal of groups I to III of the Periodic Table,
 (b) a compound represented by the formula $$(TiCl_a)(MgCl_2)_y(AlCl_3)_z(RMgCl)_b$$

in which $2 \leq a \leq 3$, $y \leq 2$, $0 \leq z \leq \frac{1}{3}$, $0 \leq b \leq 1$ and R is an aliphatic or aromatic hydrocarbon radical, and
 (c) a compound represented by the formula $$TiCl_3(AlCl_3)_w(E, TiCl_4)_x$$

in which $0 \leq w \leq \frac{1}{3}$, $0 \leq x \leq 0,03$ and E is a diisoamyl- or di-n-butylether,
wherein the compound (b) is not injected in the same reaction zone as the compound (c), wherein the residence time of each catalytic compound in its own reaction zone is between 1 and 150 seconds, and wherein the amounts of (a), (b) and (c) are such that the atomic ratio Al/Ti is between 1 and 10 in each reaction zone.

2. A process according to claim 1, wherein the ratio (c)/(b) of the molar flow rates of the catalytic compounds is between 1 and 9.

3. A process according to claim 1, wherein the compound (b) of the catalytic system is produced "in situ" by reacting violet titanium trichloride with anhydrous magnesium chloride, both reactants being injected by separate feed-lines which open concentrically into the concerned reaction zone.

4. A process according to claim 1, wherein ethylene is copolymerised with an α-olefin.

5. A process according to claim 1, wherein ethylene is terpolymerised with propylene and a non-conjugated diolefin.

6. A process according to claim 1, wherein x is 0.

7. The process according to claim 1, wherein activator (a) is selected from the group consisting of alkylaluminums and alkylsiloxalanes.

* * * * *

UNITED STATES PATENT AND TRADEMARK OFFICE
CERTIFICATE OF CORRECTION

PATENT NO. : 4,210,734
DATED : July 1, 1980
INVENTOR(S) : JEAN P. MACHON

It is certified that error appears in the above-identified patent and that said Letters Patent are hereby corrected as shown below:

Claim 1, line 11:

"$y \leqq 2$" should read --$y \geqq 2$--.

Signed and Sealed this

Twenty-eighth Day of October 1980

[SEAL]

Attest:

SIDNEY A. DIAMOND

*Attesting Officer*  *Commissioner of Patents and Trademarks*